US012626975B2

(12) United States Patent
Kang et al.

(10) Patent No.: US 12,626,975 B2
(45) Date of Patent: May 12, 2026

(54) END COVER ASSEMBLY, BATTERY CELL, BATTERY, AND ELECTRIC APPARATUS

(71) Applicant: JIANGSU CONTEMPORARY AMPEREX TECHNOLOGY LIMITED, Changzhou (CN)

(72) Inventors: Wenlong Kang, Changzhou (CN); Xiaoping Zhang, Changzhou (CN); Chengyou Xing, Changzhou (CN)

(73) Assignee: JIANGSU CONTEMPORARY AMPEREX TECHNOLOGY LIMITED, Changzhou (CN)

( * ) Notice: Subject to any disclaimer, the term of this patent is extended or adjusted under 35 U.S.C. 154(b) by 707 days.

(21) Appl. No.: 18/058,761

(22) Filed: Nov. 24, 2022

(65) Prior Publication Data

US 2023/0112464 A1　Apr. 13, 2023

Related U.S. Application Data

(63) Continuation of application No. PCT/CN2021/111618, filed on Aug. 9, 2021.

(30) Foreign Application Priority Data

Oct. 13, 2020　(CN) .......................... 202022269855.8

(51) Int. Cl.
　*H01M 50/148* 　(2021.01)
　*H01M 50/636* 　(2021.01)
(52) U.S. Cl.
　CPC ....... *H01M 50/148* (2021.01); *H01M 50/636* (2021.01)

(58) Field of Classification Search
　CPC ............. H01M 50/148; H01M 50/636; H01M 50/645; H01M 10/48; H01M 10/4228;
　　　(Continued)

(56) References Cited

U.S. PATENT DOCUMENTS

2002/0004168 A1　　1/2002　Iwata et al.
2010/0159320 A1*　6/2010　Kim .................... H01M 50/636
　　　　　　　　　　　　　　　429/178
　　　　　(Continued)

FOREIGN PATENT DOCUMENTS

CN　　　104396053 A　　3/2015
CN　　　104471750 A　　3/2015
　　　　　(Continued)

OTHER PUBLICATIONS

The European Patent Office (EPO) The Extended European Search Report for 21879081.4 Dec. 19, 2023 7 Pages.
(Continued)

*Primary Examiner* — Matthew T Martin
*Assistant Examiner* — Bartholomew A Hornsby
(74) *Attorney, Agent, or Firm* — ANOVA LAW GROUP, PLLC

(57) ABSTRACT

An end cover assembly for a battery cell includes an end cover provided with a through hole, a sealing member configured to seal the through hole and connected to the end cover to form a joint, and a barrier member provided at the through hole with a channel formed between at least part of the barrier member and a side wall of the through hole. The channel is configured to guide fluid in the battery cell to the joint.

20 Claims, 9 Drawing Sheets

(58) Field of Classification Search
CPC ............. H01M 50/147; H01M 50/186; H01M 50/184; Y02E 60/10
See application file for complete search history.

(56) References Cited

U.S. PATENT DOCUMENTS

| | | | | |
|---|---|---|---|---|
| 2015/0236336 | A1* | 8/2015 | Hirakawa | H01M 50/636 |
| | | | | 429/185 |
| 2020/0243816 | A1* | 7/2020 | Terauchi | H01M 50/224 |

FOREIGN PATENT DOCUMENTS

| | | | |
|---|---|---|---|
| CN | 205944228 | U | 2/2017 |
| CN | 206893706 | U | 1/2018 |
| CN | 207441850 | U | 6/2018 |
| CN | 207490000 | U | 6/2018 |
| CN | 208873781 | U | 5/2019 |
| CN | 212136496 | U | 12/2020 |
| EP | 2207225 | A1 | 7/2010 |
| JP | 2013058408 | A | 3/2013 |
| JP | 2013161596 | A * | 8/2013 |
| JP | 2017091721 | A * | 5/2017 |
| JP | 2017188465 | A | 10/2017 |
| WO | 2014017156 | A1 | 1/2014 |

OTHER PUBLICATIONS

The Japan Patent Office (JPO) Notification of Reasons for Refusal for Application No. 2022-562349 Nov. 27, 2023 5 Pages (including translation).
The World Intellectual Property Organization (WIPO) International Search Report and Written Opinion for No. PCT/CN2021/111618 Oct. 29, 2021(including translation) 15 pages.

* cited by examiner

<u>1</u>

<u>10</u>

20

30

A–A

B

434

432

433

431

433

431

432

434

END COVER ASSEMBLY, BATTERY CELL, BATTERY, AND ELECTRIC APPARATUS

CROSS-REFERENCE TO RELATED APPLICATIONS

This application is a continuation of International Application No. PCT/CN2021/111618, filed on Aug. 9, 2021, which claims priority to Chinese Patent Application No. 202022269855.8, filed on Oct. 13, 2020 and entitled "END COVER ASSEMBLY, BATTERY CELL, BATTERY, AND ELECTRIC APPARATUS", the entire contents of both of which are incorporated herein by reference.

TECHNICAL FIELD

This application relates to the field of energy storage technologies, and in particular, to an end cover assembly, a battery cell, a battery, and an electric apparatus.

BACKGROUND

Rechargeable battery cells have been widely used in electric vehicles due to the advantages of high energy density, high power density, long cycle life, long storage time, and the like. Currently, the sealing of battery cells is constraining the development of battery cells, and therefore technology related to sealing of battery cells has become one of the subjects of research.

SUMMARY

Embodiments of this application provide an end cover assembly, a battery cell, a battery, and an electric apparatus. The end cover assembly can meet a sealing requirement of the battery cell.

According to a first aspect, the embodiments of this application propose an end cover assembly for a battery cell. The end cover assembly includes: an end cover, provided with a through hole; a sealing member, configured to seal the through hole, where the sealing member is connected to the end cover to form a joint; and a barrier member, provided in the through hole with a channel formed between at least part of the barrier member and a side wall of the through hole, where the channel is configured to guide fluid in the battery cell to the joint.

This configuration allows the fluid inside the battery cell to flow through the channel to the joint. When a leak occurs at the joint between the sealing member and the end cover, the fluid inside the battery cell can be detected so as to provide feedback on whether a leak has occurred between the sealing member and the end cover, so that remedial measures can be taken for the leaked end cover assembly before it leaves the factory. Such configuration can better ensure proper sealing of the end cover assembly and meet the sealing requirement of the battery cell.

According to an aspect of the embodiments of this application, a surface of the barrier member facing the side wall is provided with a first notch, and the channel is formed between the first notch and the side wall. With this configuration, the channel is easy to process and form, the strength loss of the barrier member is small, and the barrier member is not easily deformed, effectively avoiding blocking of the channel due to deformation of the barrier member, and thereby ensuring testing accuracy of the sealing performance of the joint between the sealing member and the end cover.

According to an aspect of the embodiments of this application, a cross-sectional area of the channel progressively decreases along an axial direction of the through hole toward a side of the sealing member closer to the through hole. With this configuration, a lower opening of the channel can be enlarged as much as possible to help the fluid flow to the joint, and ensure stable cooperation between the barrier member and the through hole.

According to an aspect of the embodiments of this application, the through hole includes two opposite ports in an axial direction of the through hole, and the first notch always penetrates through the two ports. With the foregoing configuration, the channel can be kept open, ensuring that the fluid can flow through the channel to the joint between the sealing member and the end cover.

According to an aspect of the embodiments of this application, the barrier member includes a first part and a second part that are disposed in succession, the first part is located inside the through hole, the first notch is provided at the first part, and the second part protrudes from the end cover. By adopting this structural form, the barrier member, while meeting a requirement of forming a channel with the sidewall of the through hole, can also have a simple structure, making it easy to form and easy to remove from or install into the through hole.

According to an aspect of the embodiments of this application, the second part is provided with a second notch, and the second notch communicates with the first notch. In one aspect, the provision of the second notch enables the barrier member to be positioned in a predetermined direction in a carrying box (that is, before the barrier member fits into the through hole of the end cover), helping a robotic hand grip the barrier member and install it into the through hole. In another aspect, the provision of the second notch makes it easy for the fluid flow to the channel. In still another aspect, the provision of the second notch also causes a radial length of the second part to be smaller than a radial length of the first part, helping fitting of the barrier member.

According to an aspect of the embodiments of this application, a surface where the first notch is formed is flat, or a surface where the first notch is formed is curved. When the surface of the first notch is flat, the first notch can be easily formed by cutting along a predetermined direction. When the surface of the first notch is curved, a contact area between the barrier member and the wall surface of the through hole can be ensured with the size requirement of the channel satisfied, thereby guaranteeing connection strength between the barrier member and the end cover.

According to an aspect of the embodiments of this application, the end cover is further provided with a depression, the depression is disposed in correspondence to the through hole and communicates with the through hole, and the depression is configured to accommodate the sealing member. The provision of the depression facilitates easy installation of the sealing member and connection of it to the end cover to form a joint, helping the sealing of the through hole and allowing the sealing member to be disposed without protruding from the end cover, thereby reducing an overall thickness of the end cover assembly.

In another aspect, the embodiments of this application provide a battery cell including a housing provided with an internal space and an opening that communicates with the internal space; and the foregoing end cover assembly, where the end cover assembly closes the opening, and the channel communicates with the internal space.

As the battery cell according to the embodiments of this application includes the end cover assembly according to the foregoing embodiments of this application, the provision of the channel in the end cover assembly allows the fluid inside the battery cell to flow through the channel to the joint. When a leak occurs at the joint between the sealing member and the end cover, the fluid inside the battery cell can be detected so as to provide feedback on whether a leak has occurred between the sealing member and the end cover, so that remedial measures can be taken for the leaked battery cell before it leaves the factory, ensuring proper sealing of the battery cell.

In still another aspect, the embodiments of this application provide a battery including the foregoing battery cell.

Including the battery cell provided in the foregoing embodiments, the battery provided according to the embodiments of this application has good sealing performance and high security.

In yet another aspect, the embodiments of this application provide an electric apparatus including the foregoing battery cell, where the battery cell is configured to supply electrical energy.

Including the battery cell provided in the foregoing embodiments, the electric apparatus provided according to the embodiments of this application has good sealing performance and high security.

BRIEF DESCRIPTION OF DRAWINGS

To describe the technical solutions in the embodiments of this application more clearly, the following briefly describes the accompanying drawings required for describing the embodiments of this application. Apparently, the accompanying drawings in the following description show merely some embodiments of this application, and a person of ordinary skill in the art may still derive other drawings from the accompanying drawings without creative efforts.

4

Figure 16:
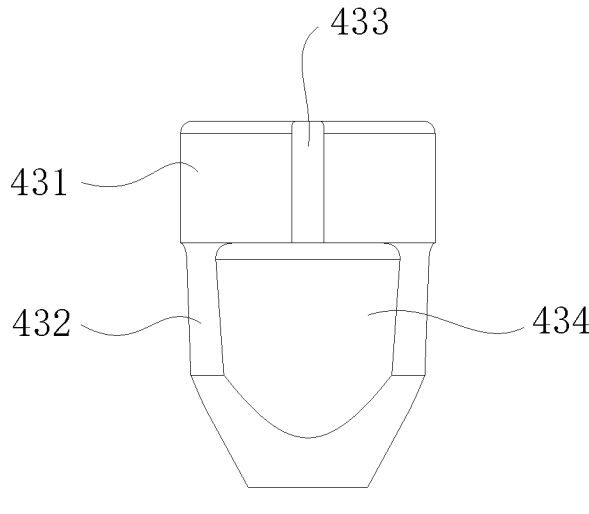
Figure 17:
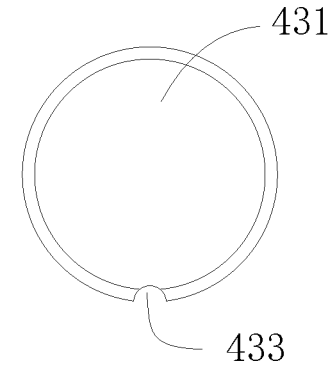
Figure 18:
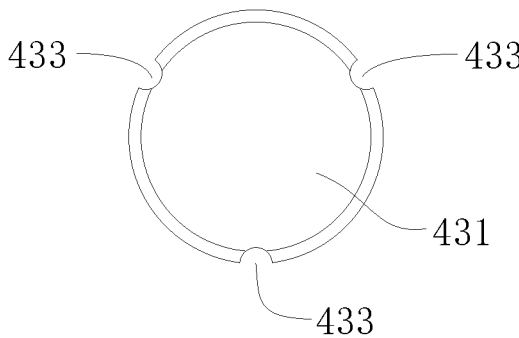

FIG. 16 is a side view of a barrier member according to another embodiment of this application;

FIG. 17 is a top view of a barrier member according to another embodiment of this application; and FIG. 18 is a top view of a barrier member according to still another embodiment of this application.

In the drawings:

1. vehicle; 1*a*. motor; 1*b*. controller;

10. battery; 11. box; 111. first box body; 112. second box body;

20. battery module;

30. battery cell;

31. housing; 32. electrode assembly; 321. body portion; 322. tab;

40: end cover assembly;

41. end cover; 411. through hole; 412. depression;

42. sealing member; 421. escape groove;

43. barrier member; 431. first part; 432. second part; 433. first notch; 434. second notch;

44. channel;

45. electrode terminal;

46. joint;

X. axial direction.

DESCRIPTION OF EMBODIMENTS

The following further describes the embodiments of this application in detail with reference to the accompanying drawings and implementations. The detailed description of embodiments and the accompanying drawings of are intended to illustrate the principle of this application, rather than to limit the scope of this application. This application is not limited to the embodiments described herein.

In the description of this application, it should be noted that, unless otherwise stated, "a plurality of" means two or more; and the orientations or positional relationships indicated by the terms "upper", "lower", "left", "right", "inside", "outside", and the like are merely intended to help the description of this application and simplify the description rather than indicate or imply that the apparatuses or components must have specific orientations, or be constructed and manipulated according to specific orientations. These terms shall therefore not be construed as limitations on this application. In addition, the terms "first" and "second" are merely intended for a purpose of description, and shall not be understood as an indication or implication of relative importance. "Perpendicular" means being perpendicular with an allowable range of error other than being strictly perpendicular. "Parallel" means being parallel with an allowable range of error other than being strictly parallel.

An "embodiment" mentioned in this application means that specified features, structures, or characteristics described with reference to this embodiment may be included in at least one embodiment of this application. The word "embodiment" in various places in the specification does not necessarily refer to a same embodiment, or refer to an independent or alternative embodiment that is exclusive of other embodiments. A person skilled in the art can clearly and implicitly understand that the embodiments described in this application can be combined with other embodiments.

In the description of this application, it should be further noted that unless otherwise specified and defined explicitly, the terms "mount", "connect", and "join" should be understood in their general senses. For example, they may refer to a fixed connection, a detachable connection, or an integral connection, and may refer to a direct connection or an indirect connection via an intermediate medium. A person of ordinary skill in the art can understand specific meanings of these terms in this application as appropriate to specific situations.

After noticing frequent occurrence of poor sealing of battery cells which causes an internal electrode assembly to degrade extremely fast because of exposure to moist air, the applicant studied and analyzed various structures of battery cells and has found that an end cover of an end cover assembly typically needs to be provided with a through hole to meet requirements such as electrolyte filling or degassing. For sealing of the through hole, a barrier member and a sealing member are typically provided. The barrier member is installed into the through hole of the end cover assembly to seal the through hole, and the sealing member is placed at an end of the through hole and welded to the end cover assembly to implement double sealing of the through hole. A helium test is used to check the reliability of the welding between the sealing member and the end cover. The foregoing design comes with a problem: when the welding at the end of the through hole between the sealing member and the end cover assembly fails, the helium test will not be able to detect the welding failure because sealing is still in place inside the through hole between the barrier member and the through hole. Such a battery cell, with its barrier member inside the through hole falling off under complicated operating conditions, will lose the double sealing of the barrier member and the sealing member, the electrode assembly inside the battery cell will be invaded by the moist gas in the air, and the performance of the battery cell will degrade extremely fast.

Based on the foregoing problem found by the applicant, the applicant has improved the structure of the end cover assembly of a battery cell so as to meet a sealing requirement of the battery cell.

For better understanding of this application, the following describes in detail the embodiments of this application with reference to FIG. 1 to FIG. 18.

An embodiment of this application provides an electric apparatus using a battery as a power supply. The electric apparatus may be, but is not limited to, a vehicle, a ship, an aircraft, or the like.

Figure 1:
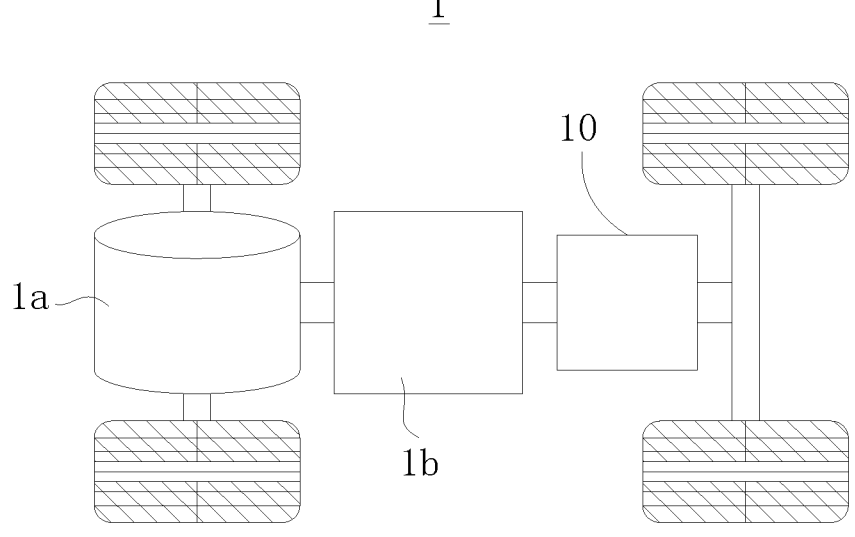
FIG. 1 is a schematic structural diagram of a vehicle according to an embodiment of this application.

As shown in FIG. 1, an embodiment of this application provides a vehicle 1. The vehicle 1 may be an oil-fueled vehicle, a gas-fueled vehicle, or a new energy vehicle. The new energy vehicle may be a battery electric vehicle, a hybrid electric vehicle, an extended-range electric vehicle, or the like. In an embodiment of this application, the vehicle 1 may include a motor 1a, a controller 1b, and a battery 10. The controller 1b is configured to control the battery 10 to supply power to the motor 1a. The motor 1a is connected to wheels through a transmission mechanism to drive the vehicle 1 to move. The battery 10 may be used as a driving power supply of the vehicle 1, replacing or partially replacing fuel oil or natural gas to provide driving power for the vehicle 1. In an example, the battery 10 may be disposed at the bottom, the front, or the rear of the vehicle 1. The battery 10 may be configured to supply electricity to the vehicle 1. In an example, the battery 10 may be used as an operating power supply for the vehicle 1 and applied to a circuit system of the vehicle 1. In an example, the battery 10 may be configured to meet power usage requirements of the vehicle 1 for starting, navigating, and operating.

Figure 2:
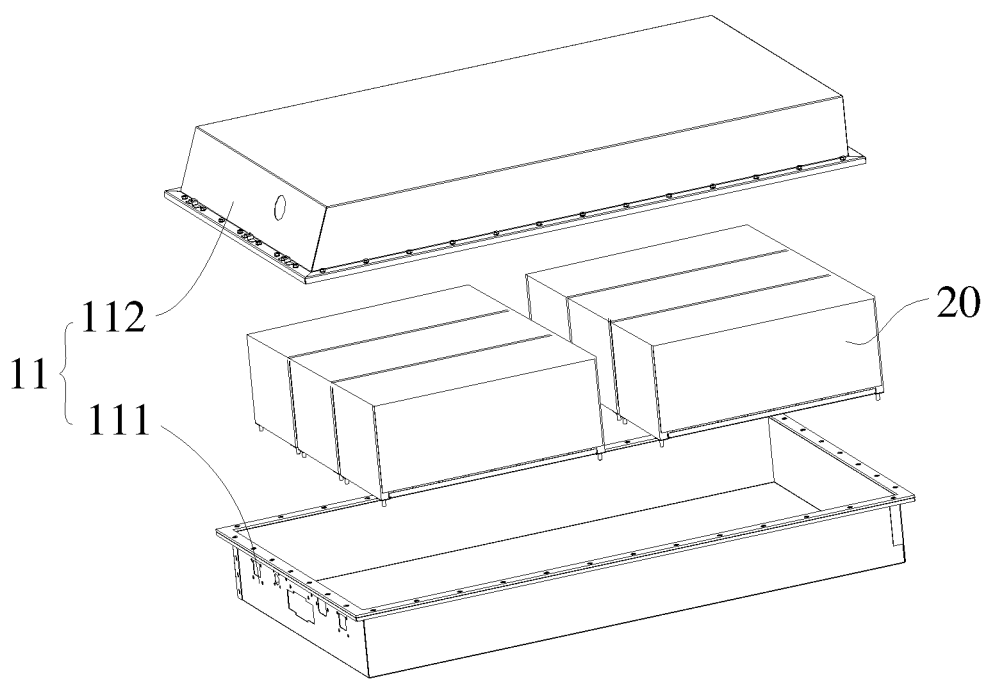
FIG. 2 is a schematic exploded view of a battery according to an embodiment of this application.

Referring to FIG. 2, the battery 10 may include two or more battery modules 20. In some embodiments, the battery 10 further includes a box 11. The battery modules 20 are disposed inside the box 11. Two or more battery modules 20 are arranged inside the box 11. The box 11 is not limited to a specific type. The box 11 may be a frame-shaped box, a disk-shaped box, a box-shaped box, or the like. In some embodiments, the box 11 includes a first box body 111 configured to accommodate the battery modules 20 and a second box body 112 engaged to the first box body 111. The first box body 112 is engaged to the second box body 111 to form an accommodating cavity for accommodating the battery modules 20. In some embodiments, the battery 10 may alternatively include one battery module 20. In other embodiments, the battery 10 includes a box 11 and a plurality of battery cells directly disposed in the box 11.

Figure 3:
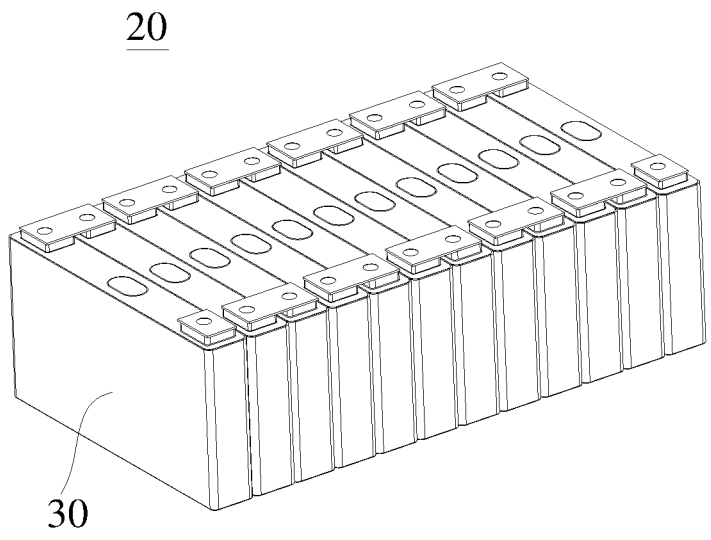
FIG. 3 is a schematic structural diagram of a battery module according to an embodiment of this application.

Referring to FIG. 3, the battery module 20 includes two or more battery cells 30. The battery module 20 can be provided in various ways. In an embodiment, the battery module 20 includes an accommodating portion (not shown in the figure) and two or more battery cells 30 located in the accommodating portion. The two or more battery cells 30 are disposed side by side inside the accommodating portion. The accommodating portion can be provided in various ways. For example, the accommodating portion includes a housing and a cover plate covering the housing. Alternatively, the accommodating portion includes a side plate and an end plate that are connected in turn to form an enclosure. Alternatively, the accommodating portion includes two end plates disposed opposite each other and a band that surrounds outside the end plates and the battery cell 30.

Figure 4:
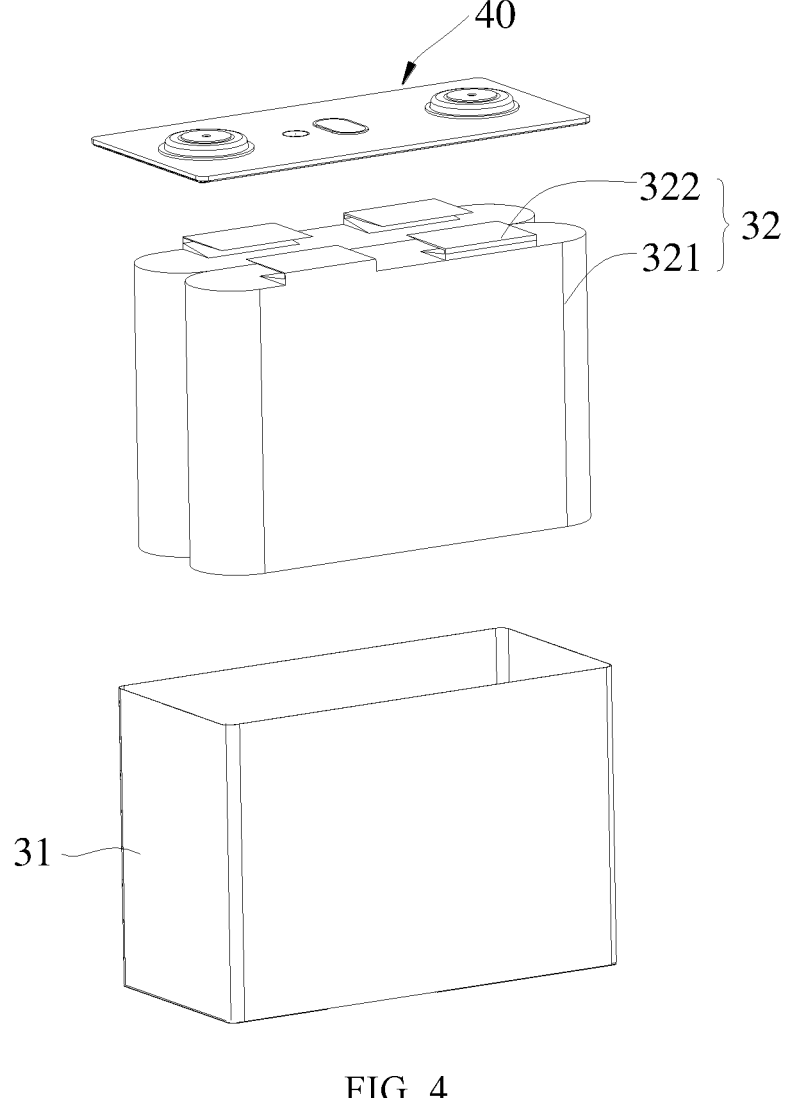
FIG. 4 is a schematic structural exploded view of a battery cell according to an embodiment of this application.
Figure 5:
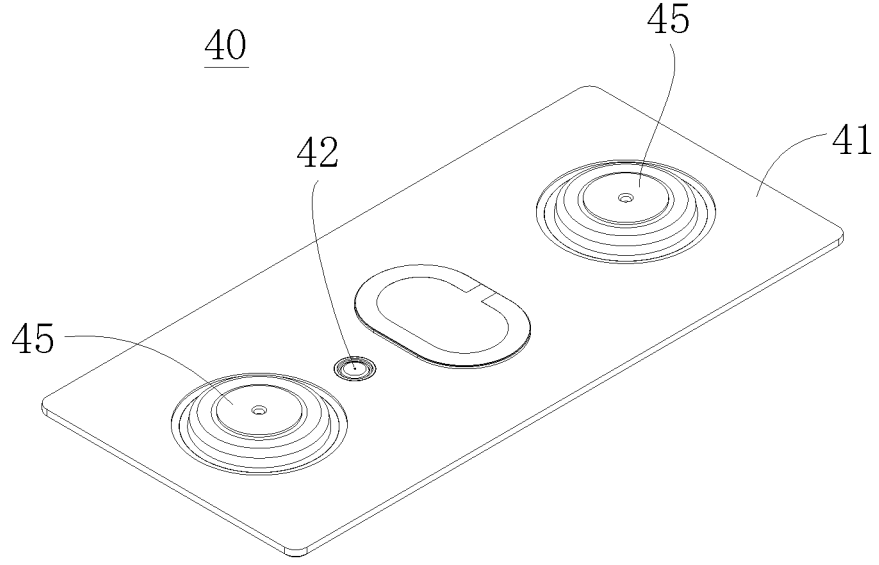
FIG. 5 is a schematic structural diagram of an end cover assembly according to an embodiment of this application.
Figure 6:
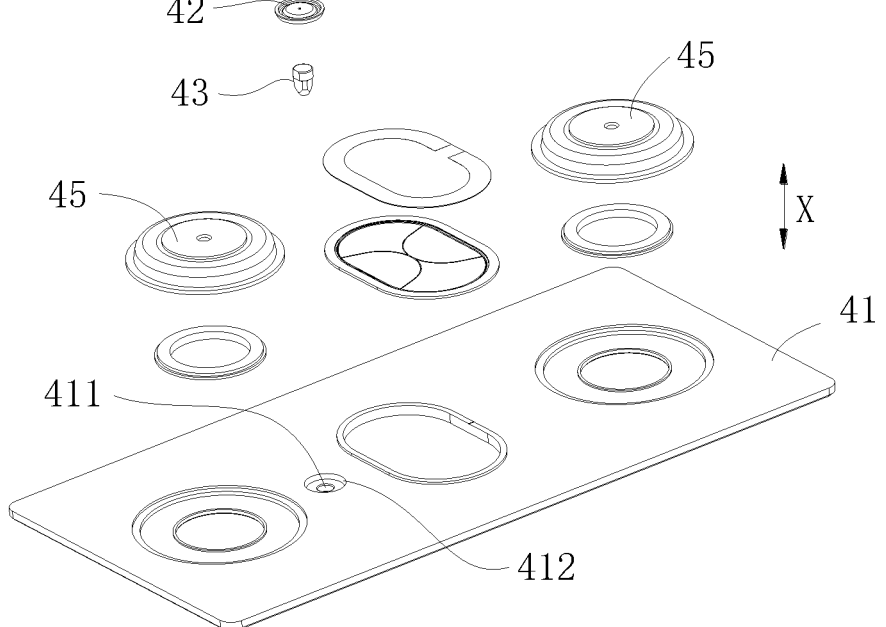
FIG. 6 is a schematic structural diagram of an end cover assembly according to an embodiment of this application.
Figure 7:
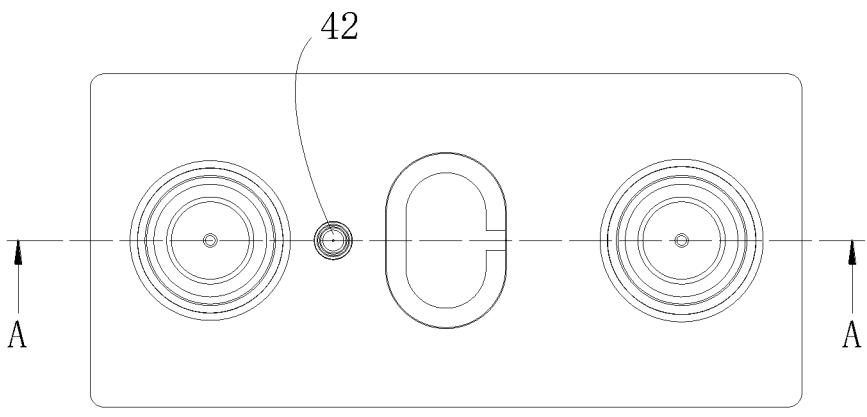
FIG. 7 is a top view of an end cover assembly according to an embodiment of this application.
Figure 8:
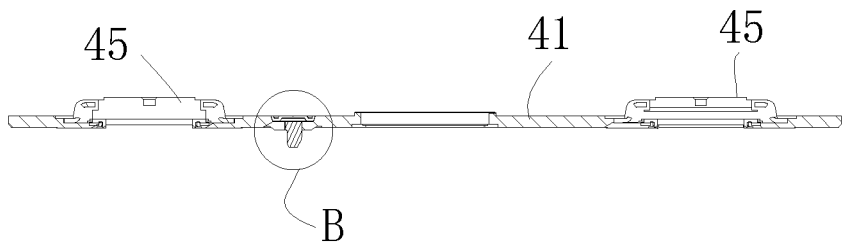
FIG. 8 is a cross-sectional view along the A-A direction in FIG. 7.
Figure 9:
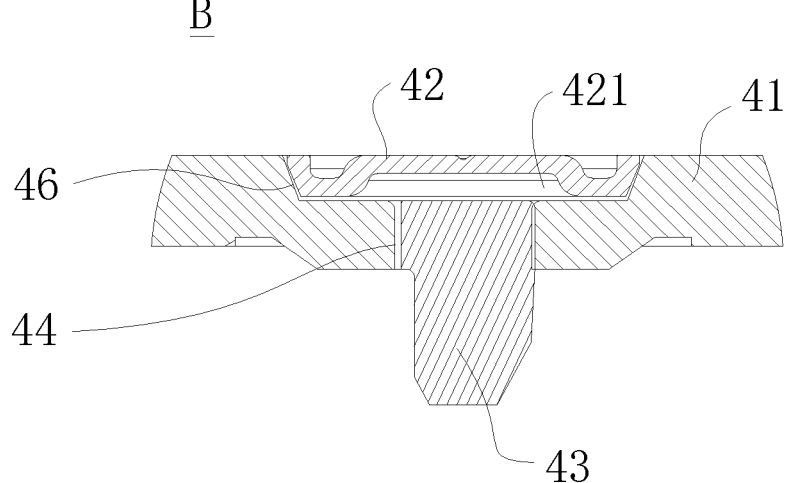
FIG. 9 is an enlarged view of B in FIG. 8.
Figure 10:
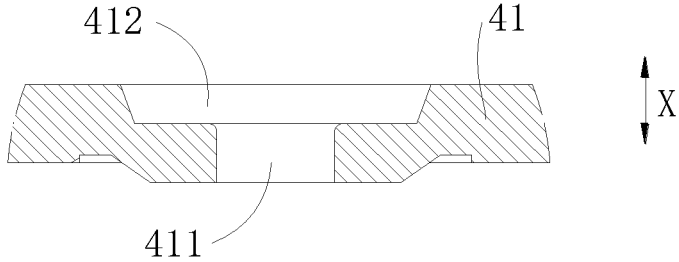
FIG. 10 is a partial cross-sectional view of an end cover according to an embodiment of this application.

Referring to FIG. 4, a battery cell 30 in an embodiment of this application includes a housing 31 and an electrode assembly 32 disposed in the housing 31. The housing 31 in this embodiment of this application is rectangular, round, or of other shapes. The housing 31 is provided with an internal space accommodating the electrode assembly 32 and an electrolyte and an opening in communication with the internal space. The housing 31 may be made of materials such as aluminum, aluminum alloy, steel, or plastic.

The electrode assembly 32 in this embodiment of this application may be formed through stacking or winding of a first electrode plate, a second electrode plate, and a separator located between the first electrode plate and the second electrode plate, where the separator is an insulator sandwiched between the first electrode plate and the second electrode plate. In this embodiment, the first electrode plate is a positive electrode plate, and the second electrode plate is a negative electrode plate. The positive electrode plate and the negative electrode plate both have a coating area and a non-coating area. A positive active material is applied on the coating area of the positive electrode plate, and a negative active material is applied on the coating area of the negative electrode plate. In the coating area, the active material is applied on a current collector formed by a metal foil sheet, and no active material is applied on the non-coating area. The electrode assembly 32 further includes two tabs 322: a positive tab and a negative tab. The coating area of the positive electrode plate and the coating area of the negative electrode plate form a body portion 321. The non-coating areas of the positive electrode plate are stacked to form the negative tab. and the non-coating areas of the second electrode plate are stacked to form the negative tab. In some embodiments, the body portion 321 has two end faces that facing away from each other along a height direction, and the positive tab and the negative tab may each extend out from one end face of the body portion 321.

Continue to refer to FIG. 4 to FIG. 10. The battery cell 30 in this embodiment of this application further includes an end cover assembly 40 hermetically connected to the housing 31. The end cover assembly 40 includes an end cover 41, an electrode terminal 45, a sealing member 42, and a barrier member 43. The electrode terminal 45 may be electrically connected to the tab 322 of the electrode assembly 32, and the electrode terminal 45 is disposed on the end cover 41. The electrode terminal 45 may be round or rectangular, which is not limited herein.

The end cover 41 is provided with a through hole 411, the sealing member 42 is configured to seal the through hole 411, and the sealing member 42 is connected to the end cover 41 to form a joint 46. The barrier member 43 is provided in the through hole 411 and a channel 44 is formed between at least part of the barrier member 43 and a side wall of the through hole 411. The channel 44 is configured to guide fluid in the battery cell 30 to the joint 46.

The end cover assembly 40 provided in this embodiment of this application, when applied to the battery cell 30, may close the opening of the housing 31, specifically, by connecting the end cover 41 to the housing 31 hermetically. The through hole 411 in the end cover 41 can be used for injecting electrolyte, discharging gas from inside the battery cell 30, or the like. The sealing member 42 is used to seal the through hole 411 and can form a joint 46 with the end cover 41. The barrier member 43 is located in the through hole 411 and can form a channel 44 with the side wall of the through hole 411, and the channel 44 communicates with the internal space of the housing 31. The barrier member 43 can partially stop the fluid inside the battery cell 30. With the provision of the channel 44, when a leak occurs at the joint 46 between the sealing member 42 and the end cover 41, the fluid inside the battery cell 30 can flow through the channel 44 to the joint 46 and be detected so as to provide feedback on whether a leak has occurred between the sealing member 42 and the end cover 41. The sealing performance of the end cover assembly 40 can be better ensured to meet the sealing requirement of the battery cell 30.

For example, a given amount of helium gas can be injected inside the battery cell 30, and when a leak occurs at the joint 46 between the sealing member 42 and the end cover 41 due to poor welding or other reasons, the helium gas will flow to the joint 46 through the channel 44 formed between the barrier member 43 and the side wall of the through hole 411. Therefore, a leaking location of the joint 46 can be detected by a detection equipment, and repair welding or other remedial measures can be taken to ensure the proper sealing of the joint 46 between the sealing member 42 and the end cover 41, thus guaranteeing safety and service life of the battery cell 30.

In the end cover assembly 40 provided in this embodiment of this application, the channel 44 is formed between the barrier member 43 and the side wall of the through hole 411, so that the channel 44 is easy to process and form, the strength loss of the barrier member 43 is small, and the barrier member 43 is not easily deformed. This effectively avoids blocking of the channel 44 blocking due to the deformation of the barrier member 43, thereby ensuring testing accuracy of the sealing performance of the joint 46 between the sealing member 42 and the end cover 41.

Figure 11:
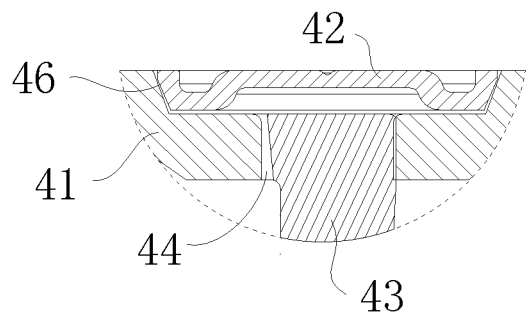
FIG. 11 is a partial cross-sectional view of an end cover fitting into a barrier member of an end cover assembly in another embodiment of this application.

Referring to FIG. 11, in some embodiments, a cross-sectional area of the channel 44 progressively decreases along an axial direction X of the through hole 411 toward a side of the sealing member 42 closer to the through hole 411. With the foregoing configuration, a lower opening of the channel 44 can be enlarged as much as possible to help the fluid flow to the joint 46, and ensure stable cooperation between the barrier member 43 and the through hole 411.

Continue to refer to FIG. 11. For example, the cross-sectional area of the channel 44 may gradually decrease along the axial direction X of the through hole 411 toward the side of the sealing member 42 closer to the through hole 411.

Figure 12:
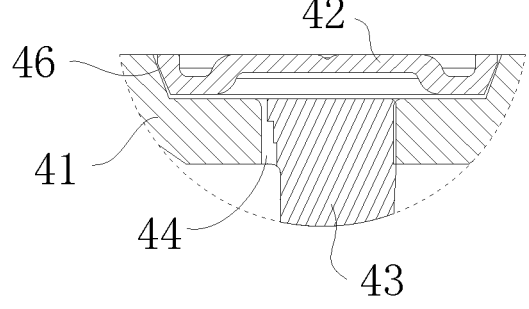
FIG. 12 is a partial cross-sectional view of an end cover fitting into a barrier member of an end cover assembly in still another embodiment of this application.

Referring to FIG. 12, in some embodiments, the cross-sectional area of the channel 44 may alternatively decrease segment by segment along the axial direction X of the through hole 411 toward the side of the sealing member 42 closer to the through hole 411, which can also achieve progressive decrease of the cross-sectional area of the channel 44.

Still referring to FIG. 4 to FIG. 12, in some embodiments, in the end cover assembly 40 provided in the foregoing embodiments, the end cover 41 may be further provided with a depression 412, and the depression 412 is disposed in correspondence to the through hole 411 and communicates with the through hole 411. In some embodiments, the depression 412 can be disposed in correspondence to the through hole 411 in the axial direction X of the through hole 411, and the depression 412 is configured to accommodate the sealing member 42. The provision of the depression 412 facilitates easy installation of the sealing member 42 and connection of it to the end cover 41 to form the joint 46, helping the sealing of the through hole 411, In addition, this allows the sealing member 42 to be disposed without protruding from the end cover 41, thereby reducing an overall thickness of the end cover assembly 40.

In some embodiments, the sealing member 42 may be provided with an escape groove 421 on a side close to the barrier member 43. The provision of the escape groove 421 prevents the sealing member 42 from interfering with the barrier member 43 during fitting, helping the fitting of the sealing member 42.

Figure 13:
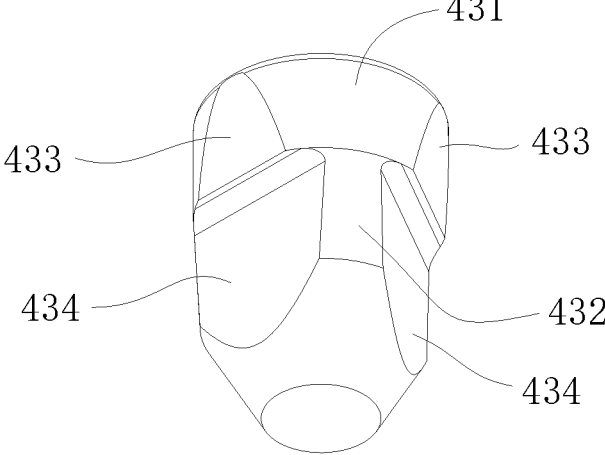
FIG. 13 is a schematic structural diagram of a barrier member according to an embodiment of this application.
Figure 14:
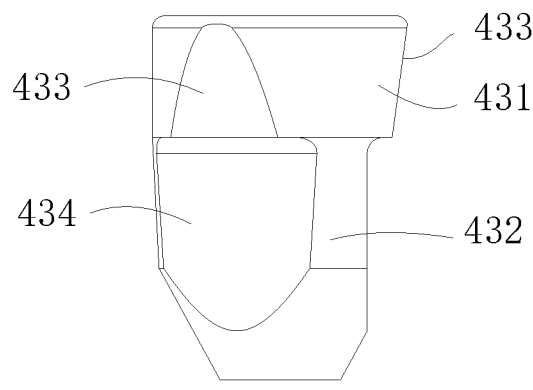
FIG. 14 is a side view of a barrier member according to an embodiment of this application.

Referring to FIG. 13 to FIG. 14, in some embodiments, in the end cover assembly 40 provided in the foregoing embodiments, the barrier member 43 may be provided with a first notch 433 in a surface facing the side wall of the through hole 411, and the channel 44 is formed between the first notch 433 and the side wall. With the first notch 433 provided at the barrier member 43, the barrier member 43 cannot be fully attached to the side wall of the through hole 411, helping the formation of the channel 44.

It can be understood that forming the first notch 433 in the side wall of the barrier member 43 so that the channel 44 is formed between the first notch 433 and the side wall of the through hole 411 is only one implementation, which is not limitation. In some embodiments, the first notch 433 may alternatively be provided at the side wall of the through hole 411, which can also prevent the barrier member 43 from being fully attached to the side wall of the through hole 411, and also meet the requirement of forming the channel 44 between the barrier member 43 and the side wall of the through hall 411.

In some embodiments, in the end cover assembly 40 provided in the foregoing embodiments, the through hole 411 includes two opposite end openings in the axial direction X of the through hole 411, and the first notch 433 always penetrates through the two end openings. With the foregoing configuration, the channel 44 can be kept open, ensuring that the fluid can flow through the channel 44 to the joint 46 between the sealing member 42 and the end cover 41.

Still referring to FIG. 13 and FIG. 14, in some embodiments, the barrier member 43 includes a first part 431 and a second part 432 that are disposed in succession, the first part 431 is located inside the through hole 411, the first notch 433 is provided at the first part 431, and the second part 432 protrudes from the end cover 41. By adopting this structural form, the barrier member 43, while meeting a requirement of forming a channel 44 with the sidewall of the through hole 411, can also have a simple structure, making it easy to form and easy to remove from or install into the through hole 411.

For example, the first part 431 of the barrier member 43 and the second part 432 of the barrier member 43 can be disposed in succession in the axial direction X of the through hole 411.

In some embodiments, the first part 431 and the second part 432 can both be cylinders, and the first part 431 may have a shape that at least partially matches a cross-sectional shape of the through hole 411.

In some embodiments, the through hole 411 may be a round hole, the first part 431 may be a cylinder that matches the shape of the through hole 411, the first notch 433 is provided at a surface of the first part 431 facing the side wall of the through hole 411, and the rest surface of the barrier member 43 is closely attached to the side wall of the through hole 411.

In some embodiments, the second part 432 may also be a cylinder. The second part 432 and the first part 431 may be coaxial.

In some embodiments, a radial length of the second part 432 may be smaller than a radial length of the first part 431 so that the fluid can flow through the channel 44 to the joint 46 more easily.

It can be understood that defining both the first part 431 and the second part 432 to be cylinders is only one implementation, which is not a limitation. In some embodiments, the first part 431 and the second part 432 may both be other polygonal prisms such as quadrangular prisms, pentagonal prisms, or regular polygonal prisms as long as the requirement of forming the channel 44 can be met.

Still referring to FIG. 13 and FIG. 14, in some embodiments, when the barrier member 43 includes the second part 432, the second part 432 may be provided with a second notch 434, and the second notch 434 communicates with the first notch 433. In one aspect, the provision of the second notch 434 enables the barrier member 43 to be positioned in a predetermined direction in a carrying box (that is, before the barrier member 43 fits into the through hole 411 of the end cover 41), helping a robotic hand grip the barrier member 43 and install it into the through hole 411. In another aspect, the provision of the second notch 434 helps the fluid flow to the channel 44. In still another aspect, the provision of the second notch 434 also causes the radial length of the second part to be smaller than the radial length of the first part, helping fitting of the barrier member 43. In some embodiments, an end of the second part 432 away from the first part 431 is a conical structure, so that the barrier member 43 can be inserted into the through hole 411.

Still referring to FIG. 13 and FIG. 14, in some embodiments, in the end cover assembly 40 provided in the foregoing embodiments, the surface of the barrier member 43 where the first notch 433 is formed may be flat, and may be formed by a direct cut along the axial direction X of the through hole 411.

Certainly, the surface may be formed by a cut along a direction intersecting with the axial direction X of the through hole 411, so as to better meet the requirement for a progressively decreased cross-sectional area of the channel 44 along the axial direction X of the through hole 411 toward the side of the sealing member 42 closer to the through hole 411.

In some embodiments, the surface of the barrier member 43 where the second notch 434 is formed may also be flat, and the second notch 434 communicates with the first notch 433.

Figure 15:
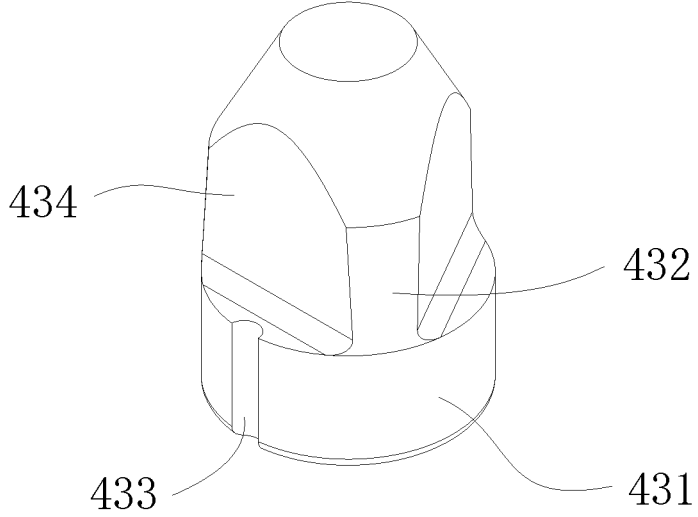
FIG. 15 is a schematic structural diagram of a barrier member according to another embodiment of this application.

Referring to FIG. 15 to FIG. 17, in some embodiments, the surface of the barrier member 43 where the first notch 433 is formed may alternatively be curved, and correspondingly, the surface where the second notch 434 is formed may also be curved or flat. These implementations are all possible as long as the requirements of forming the channel 44 and guiding the fluid to the joint 46 can be met.

In the end cover assembly 40 provided in the foregoing embodiments, the barrier member 43 may include one first notch 433, and in this case, a quantity of the second notch 434 may also be one and the second notch 434 and first notch 433 may be disposed in correspondence and communicate with each other.

Certainly, in some embodiments, referring to FIG. 18, the barrier member 43 may include two or more first notches 433, and the two or more first notches 433 are spaced apart around a circumference of the through hole 411.

In some embodiments, when three or more first notches 433 are provided, an equal included angle is present between every adjacent two of the first notches 433, such that the fluid can be evenly guided to everywhere of the joint 46 formed by the sealing member 42 and the end cover 41.

In some embodiments, when two or more first notches 433 are provided, the second notches 434 may be in the same quantity as the first notches 433, and the second notches 434 and the first notches 433 are disposed in one to one correspondence, where a first notch 433 and a second notch 434 that are disposed in correspondence communicate with each other.

The end cover assembly 40 provided in this embodiment of this application, when applied to the battery cell 30, may be connected to the housing 31 of the battery cell 30 through the end cover 41 in a sealed manner. After formation of the battery cell 30, a negative pressure pump is used to make negative pressure. After the negative pressure is achieved, a given amount of helium gas is injected into the battery cell 30, the barrier member 43 is fitted into the through hole 411, and the sealing member 42 is connected to the end cover 41 through, for example, laser welding. Because the channel 44 is formed between the barrier member 43 and the side wall of the through hole 411, and the channel 44 is connected to the joint 46 formed between the sealing member 42 and the end cover 41, the helium gas inside the battery cell 30 can be guided to everywhere of the joint 46. A leak that occurs at the joint 46 due to poor welding or the like can be detected by a helium test, so that remedial measures can be taken for the end cover assembly 40 that has leaked before it leaves the factory, ensuring that the battery cells 30 leaving the factory are properly sealed, and thereby improving their safety level and service life.

Although this application has been described with reference to some embodiments, various modifications can be made to this application without departing from the scope of this application and the components therein can be replaced with equivalents. In particular, as long as there is no structural conflict, the various technical features mentioned in the embodiments can be combined in any manner. This application is not limited to the specific embodiments disclosed in this specification, but includes all technical solutions falling within the scope of the claims.

The invention claimed is:

1. An end cover assembly for a battery cell, comprising:
an end cover, provided with a through hole;
a sealing member, configured to seal the through hole, wherein the sealing member is connected to the end cover to form a joint; and a barrier member, provided at the through hole, wherein the barrier member comprises a first part located inside the through hole, a channel is formed between the first part of the barrier member and a side wall of the through hole, and the channel is configured to guide fluid in the battery cell to the joint and is formed by:

one of the side wall of the through hole and a surface of the first part that faces the side wall of the through hall, and a notch in another one of the side wall of the through hole and the surface of the first part that faces the side wall of the through hole.

2. The end cover assembly according to claim 1, wherein a cross-sectional area of the channel decreases along an axial direction of the through hole from a side away from the sealing member toward a side closer to the sealing member.

3. The end cover assembly according to claim 2, wherein the cross-sectional area of the channel continuously decreases along the axial direction of the through hole toward the side of the sealing member closer to the through hole.

4. The end cover assembly according to claim 2, wherein the cross-sectional area of the channel decreases segment by segment along the axial direction of the through hole toward the side of the sealing member closer to the through hole.

5. The end cover assembly according to claim 1, wherein the through hole comprises two opposite end openings in an axial direction of the through hole, and the notch always penetrates through the two end openings.

6. The end cover assembly according to claim 1, wherein the barrier member further comprises a second part disposed in succession with respect to the first part and protruding from the end cover.

7. The end cover assembly according to claim 6, wherein: the notch is a first notch; and the second part is provided with a second notch, and the second notch communicates with the first notch.

8. The end cover assembly according to claim 7, wherein: the first notch is one of one or more first notches provided at the first part and the second notch is one of one or more second notches provided at the second part; and a number of the one or more second notches is same as a number of the one or more first notches, and the one or more second notches and the one or more first notches are disposed in a one to one correspondence.

9. The end cover assembly according to claim 1, wherein the through hole is a round hole, the first part is cylindrical to match a shape of the through hole, the notch is provided at the surface of the first part facing the side wall of the through hole to form the channel with the side wall of the through hole, and rest surface of the barrier member is closely attached to the side wall of the through hole.

10. The end cover assembly according to claim 6, wherein each of the first part and the second part is a cylinder, and the second part and the first part are coaxial.

11. The end cover assembly according to claim 10, wherein a radial length of the second part is smaller than a radial length of the first part.

12. The end cover assembly according to claim 1, wherein the notch is one of two or more notches provided at the barrier member, and the two or more notches are spaced apart from each other around a circumference of the through hole.

13. The end cover assembly according to claim 12, wherein the two or more notches include three or more notches, and an equal included angle is present between every adjacent two of the three or more notches.

14. The end cover assembly according to claim 1, wherein a surface where the notch is formed is flat.

15. The end cover assembly according to claim 1, wherein a surface where the notch is formed is curved.

16. The end cover assembly according to claim 1, wherein the end cover is further provided with a depression, the depression is disposed in correspondence to the through hole and communicates with the through hole, and the depression is configured to accommodate the sealing member.

17. A battery cell, comprising:

a housing, comprising an internal space and an opening that communicates with the internal space; and the end cover assembly according to claim 1 closing the opening.

18. A battery, comprising the battery cell according to claim 17.

19. An electric apparatus, comprising the battery cell according to claim 17 configured to supply electrical energy.

20. An end cover assembly for a battery cell, comprising: an end cover, provided with a through hole;

a sealing member, configured to seal the through hole, wherein the sealing member is connected to the end cover to form a joint; and a barrier member, provided at the through hole with a channel formed between the barrier member and a side wall of the through hole, wherein the channel is configured to guide fluid in the battery cell to the joint;

wherein the sealing member is provided with an escape groove on a side facing the barrier member, the escape groove being configured to avoid interference between the sealing member and the barrier member during fitting.

* * * * *